United States Patent [19]

Fujii et al.

[11] Patent Number: 5,093,817
[45] Date of Patent: Mar. 3, 1992

[54] METHOD AND APPARATUS FOR RECORDING INFORMATION ON AN OPTO-MAGNETIC RECORDING MEDIUM BY APPLYING A MODULATED LIGHT BEAM WHILE APPLYING A MAGNETIC FIELD ALTERNATING WITH A CONSTANT PERIOD

[75] Inventors: Eiichi Fujii, Yokohama; Masaharu Tsukada, Kawasaki; Takayuki Aizawa, Yokohama; Tohru Tatsuno, Fuchu; Yasuyuki Tamura, Yokohama; Norio Hashimoto, Tokyo, all of Japan

[73] Assignee: Canon Kabushiki Kaisha, Tokyo, Japan

[21] Appl. No.: 692,974

[22] Filed: Apr. 29, 1991

Related U.S. Application Data

[63] Continuation of Ser. No. 574,521, Aug. 29, 1990, abandoned, which is a continuation of Ser. No. 251,924, Oct. 3, 1988, abandoned, which is a continuation of Ser. No. 06/866,314, May 23, 1986, abandoned.

[30] Foreign Application Priority Data

May 31, 1985 [JP] Japan .................................. 60-116561

[51] Int. Cl.⁵ ........................ G11B 13/04; G11B 11/12
[52] U.S. Cl. .................................... 369/13; 360/114; 360/59
[58] Field of Search ................ 369/13, 14; 360/59, 360/114, 66; 365/122, 10

[56] References Cited

U.S. PATENT DOCUMENTS

| | | | |
|---|---|---|---|
| 3,521,294 | 7/1970 | Treves | 360/59 |
| 4,422,106 | 12/1983 | Sawazaki | 360/17 |
| 4,472,748 | 9/1984 | Kato et al. | 360/59 |
| 4,539,662 | 9/1985 | Hatano et al. | 369/13 |
| 4,550,346 | 10/1985 | Hatano | 369/13 |
| 4,630,249 | 12/1986 | Braat et al. | 360/114 |
| 4,633,338 | 12/1986 | Sato et al. | 360/114 |
| 4,712,203 | 12/1987 | Saito et al. | 369/13 |
| 4,733,385 | 3/1988 | Henmi et al. | 360/114 |

FOREIGN PATENT DOCUMENTS

| | | | |
|---|---|---|---|
| 57-78653 | 5/1982 | Japan | 360/59 |
| 60-07635 | 1/1985 | Japan | 369/13 |
| 61-187141 | 8/1986 | Japan | 369/13 |

Primary Examiner—Stuart S. Levy
Assistant Examiner—Hoa Nguyen
Attorney, Agent, or Firm—Fitzpatrick, Cella, Harper & Scinto

[57] ABSTRACT

Method and apparatus for recording information on an opto-magnetic recording medium by applying an A.C. magnetic field of a constant frequency to the opto-magnetic recording medium as a recording bias magnetic field and scanning the medium by a light beam modulated with a recording signal in synchronism with the A.C. magnetic field to record the information.

12 Claims, 2 Drawing Sheets

METHOD AND APPARATUS FOR RECORDING INFORMATION ON AN OPTO-MAGNETIC RECORDING MEDIUM BY APPLYING A MODULATED LIGHT BEAM WHILE APPLYING A MAGNETIC FIELD ALTERNATING WITH A CONSTANT PERIOD

This application is a continuation of prior application, Ser. No. 07/574,521 filed Aug. 29, 1990, which application is a continuation of prior application, Ser. No. 07/251,924 filed Oct. 3, 1988, which application is a continuation of prior application, Ser. No. 06/866,314 filed May 23, 1986, all now abandoned.

BACKGROUND OF THE INVENTION

1. Field of the Invention

The present invention relates to a method and apparatus for recording information on an opto-magnetic recording medium.

2. Related Background Art

As a memory system capable of recording information at a high recording density, one which uses a medium (a so-called opto-magnetic recording medium) having a recording layer made of a thin magnetic film such as MnBi, amorphous GdCo, GdFe, DyFe, GdTbFe, TbDyFe, TbFeCo, GdFeCo or GdTbFeCo has been known in the art. Such a memory is very useful in that erasure of information is easy.

For recording on the opto-magnetic recording medium, a light modulation system and a record magnetic field modulation system have been known in the art. In the light modulation system, a recording bias magnetic field is applied in a given direction and a light beam modulated with information to be recorded is irradiated on the recording medium to record the information. In the light modulation system, however, in order to update the information recorded on the recording medium, it is necessary to record new information after the recorded information has been erased. As a result, the recording speed of the memory system is low. In order to increase the recording speed, a separate erasing optical head may be provided in the recording and reproducing apparatus. However, the cost of such an apparatus is materially greater.

On the other hand, in the recording magnetic field modulation system, a non-modulated light beam of a constant intensity is irradiated on the recording medium and a recording magnetic field modulated with the information to be recorded is applied to record the information. This system does not have the disadvantage described above, but in order to increase the recording speed, it is necessary for the high frequency recording magnetic field modulated with the information applied to the recording medium to have a strength of several hundred oersteds. It is very difficult to apply such a recording magnetic field by means a simple device and a highly complex device is in fact required.

SUMMARY OF THE INVENTION

It is an object of the present invention to provide an information recording system to an opto-magnetic recording medium which does not require erasure of recorded information on the recording medium when the recorded information is to be updated and which assures a high recording speed when it is applied to a memory system.

It is another object of the present invention to provide an apparatus for recording information on an opto-magnetic recording medium which is simple in construction and assures a high recording speed.

The above objects of the present invention are achieved by a method and apparatus for applying an A.C. magnetic field of a constant frequency to an opto-magnetic recording medium as a recording bias magnetic field and scanning the recording medium with a light beam modulated with a recording signal in synchronism with the A.C. magnetic field.

DESCRIPTION OF THE PREFERRED EMBODIMENTS

Figure 1:
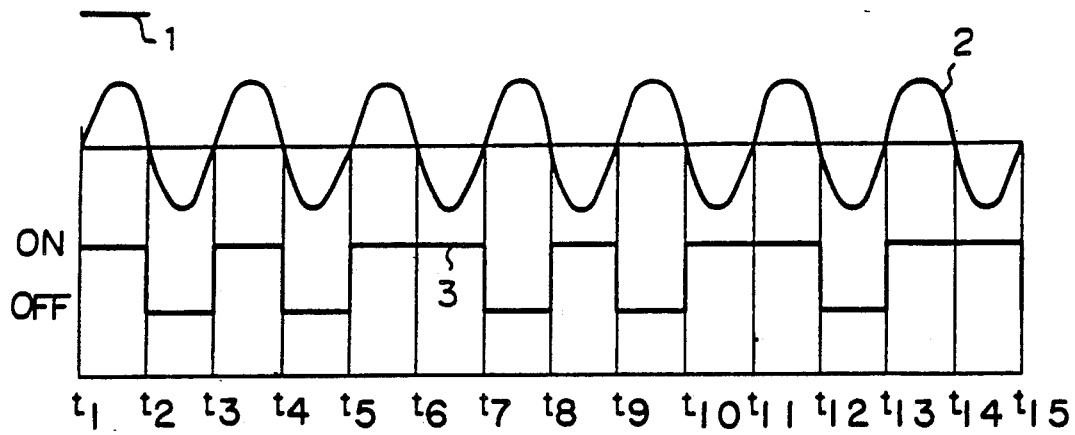
FIG. 1 is a timing chart for showing a relationship between an A.C. magnetic field and a modulation signal for a light beam in accordance with the information recording method of the present invention.
Figure 2:
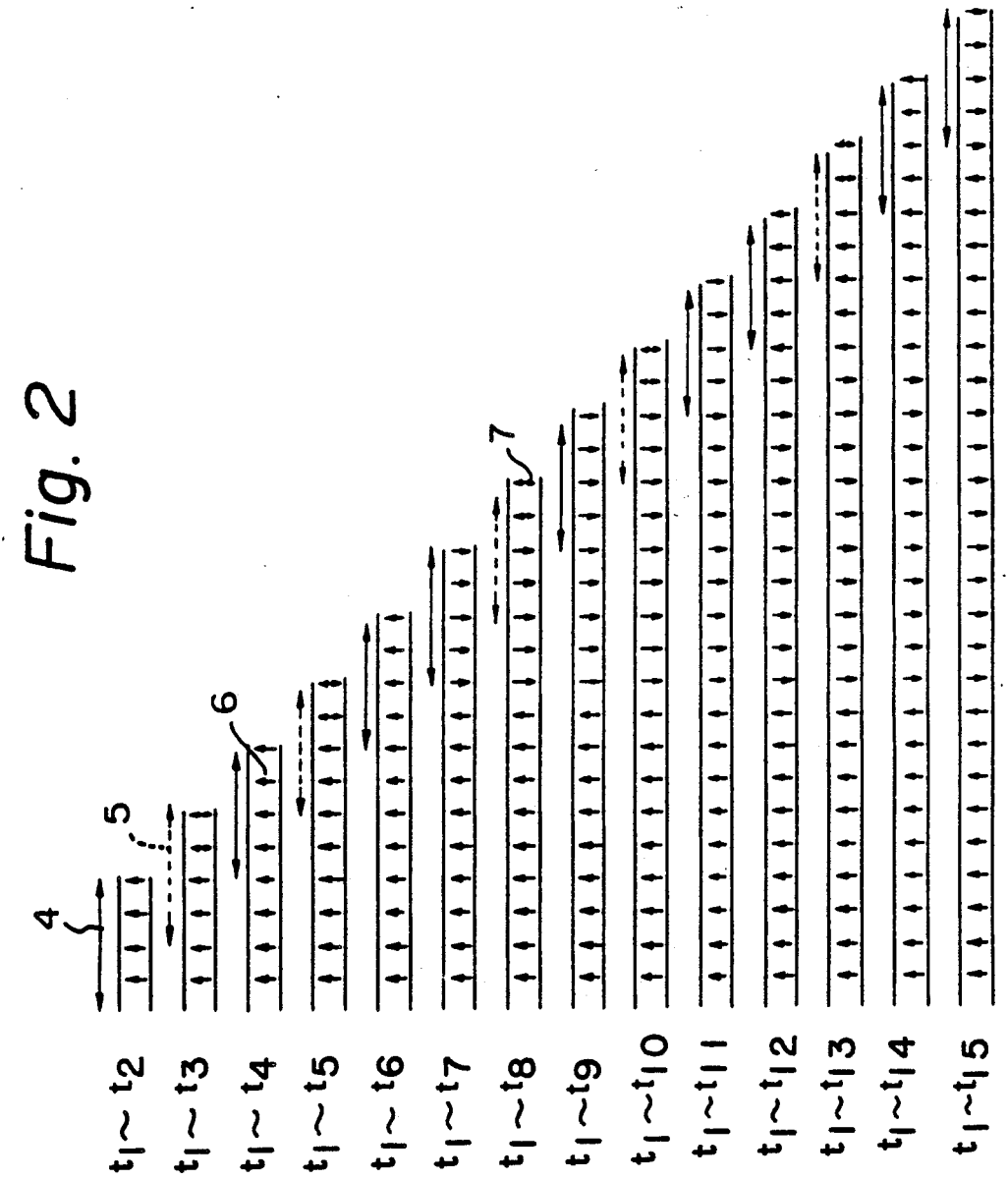
FIG. 2 shows a timing chart of recording on the recording medium by means of the method of the present invention.

FIGS. 1 and 2 show diagrams for illustrating a principle of recording using the present recording system. In FIG. 1, numeral 1 represents a diameter of a recording light beam (normally a laser beam). The light beam having such a diameter is irradiated during relative movement in time with respect to an opto-magnetic recording medium (to the right as viewed in FIG. 1). Numeral 2 denotes an A.C. magnetic field of a constant period applied to the opto-magnetic recording medium. Numeral 3 denotes a modulation signal for the recording light beam irradiated to the opto-magnetic recording medium. The modulation signal 3 is synchronized with the A.C. magnetic field 2. Namely, the modulation signal 3 is basically an on-off signal synchronized with respect to the wavelength of the A.C. magnetic field.

Because the modulation signal 3 for the light beam is synchronized with the A.C. magnetic field 2, they interact such that a direction of magnetization of the opto-magnetic recording medium is oriented in a predetermined direction without regard to the information recorded on the opto-magnetic recording medium (a direction of magnetization of the opto-magnetic recording medium). This is because recording occurs independently of the information which has already been recorded on the recording medium, which recording is merely dependent upon the data which is to be recorded. Therefore, new recording can occur over an existing recording, without the necessity of erasing. In an area where information is to be recorded with the direction of magnetization being directed upward, the recording light beam is irradiated only when the A.C. magnetic field 2 is upward, and in an area where the information is to be recorded with the direction of magnetization being directed downward, the recording light beam is irradiated only when the A.C. magnetic field is downward. If the frequency of the A.C. field 2 is low, there exists an area on the recording medium in which the direction of magnetization cannot be freely controlled. However, if the frequency of the A.C. magnetic field 2 is appropriately selected, new information can be recorded on the recording medium at a high recording density while the recorded information is erased.

In order to record the information on the recording medium using the recording system of the present invention, a relation $H > V/D$ should be met, where $H(\sec^{-1})$ is the frequency of the A.C. magnetic field 2, $V(m/\sec)$ is a relative velocity of the opto-magnetic recording medium and the location of the light beam (sometimes hereinafter referred to for convenience as the relative frequency between the medium and the light beam), and $D(m)$ is a diameter of the light beam on the medium. Thus, the applied magnetic field alternates at least once during a period from the irradiation of the beam on a point on the recording medium to the passage of the beam so that the direction of magnetization at that point can be selected.

FIG. 2 shows a timing chart of recording on the recording medium when the A.C. magnetic field 2 and the modulation signal 3 for the light beam shown in FIG. 1 are applied to the recording medium. A solid line arrow 4 represents an area of irradiation by the turned-on light beam in an incremental time period and a broken line arrow 5 represents an area of virtual irradiation (i.e., which the beam would have indicated if it was on) by the turned-off light beam. As the light beam is turned on and off, the direction of magnetization 6 of the magnetic material in the recording medium changes as shown in FIG. 2 so that the information is recorded. Double arrow 7 shows that the previously recorded information remains at that moment.

As shown in FIG. 2, the light beam has a wider span than the relative distance of travel between the light beam and the recording medium. Therefore, when the light beam cycles on and off, the recording medium has moved only an incremental distance relative to the beam and has not moved out of its zone of influence, before the light beam is again turned on at the next time interval. FIG. 2 shows that the light beam is on in time interval $t_1$ to $t_2$ and off in the next time interval. As can be seen in the interval $t_1$ to $t_3$, the data which exists on the recording medium is not influenced, because the light beam is off during this interval. However, in the next interval, the light beam is again turned on and records over any information which exists on the recording medium. Operation continues until all data has been recorded on the medium.

Each time period shown in FIG. 2 represents the entire time period from the start of operation at time $t_1$ to the end of a respective time interval. Accordingly, as shown in FIG. 2, time increments $t_1$ to $t_2$, $t_1$ to $t_3$, $t_1$ to $t_4$, etc. represent the time which has transpired from the beginning of time period $t_1$ to the end of the respective time interval. As merely an example of a time period shown in FIG. 2, the time period in the fifth row of the timing chart depicted therein represents the entire time period from $t_1$ to $t_6$. As indicated by the arrows, the light beam has been on when the magnetic field has been up or positive, in each instance, during this period. See FIG. 1. Therefore, a positive charge has been applied to the recording medium in each of the time periods from $t_1$ to $t_6$. As used herein, "positive" and "negative" merely indicate opposite directions of the alternating magnetic field. This should not be construed as limiting.

The next, or sixth, row shown in FIG. 2 represents that which occurs in the very next incremental time period to $t_7$. As shown, the direction of magnetization (arrows) in that time period face down. The remaining arrows face up. This is because, the light beam was on when the magnetic field was negative in that time period as shown in FIG. 1. The direction of magnetization changes accordingly, where and when the light beam irradiates the disc. That which has previously been recorded and which has not been affected by the light beam being on, remains the same. That is why the remaining arrows in the time period to $t_7$ face up. Therefore, the timing change in FIG. 2 in the sixth row, for example, represents the complete time period from $t_1$ to $t_7$. In the next incremental time period to $t_8$, no change occurs, because the recording light beam is off, as indicated by the dotted arrow. However, in the next time interval to $t_9$, the light beam is on when the magnetic field is negative, as shown in FIG. 1. Therefore, the arrows indicating recording face down.

Based on the example information recorded as shown in FIG. 2, the direction of magnetization is upward for the time period from $t_1$ to $t_6$, representing a "1", while the direction of magnetization from the period $t_6$ to $t_{11}$ is downward, representing a "0", the direction of magnetization is again upward between the time periods $t_{11}$ to $t_{14}$, representing a "1".

This discussion is merely representative of the operation of the device as shown in FIG. 2, when read in conjunction with the timing chart shown in FIG. 1. Moreover, this operation is merely representative of the novel recording method and apparatus of the instant invention and should not be construed to limit such operation. Recording may be conducted based on any data which is to be input.

In the prior art light modulation system, it is necessary to erase the recorded information when it is to be updated because the direction of the bias magnetic field is in one direction. In the present system, since the A.C. magnetic field is synchronized with the modulated light beam and has varying direction, it is not necessary to erase the recorded information in order to update it and the simultaneous erasing and updating of the information can be attained as is done in the recording magnetic field modulation system.

Figure 3:
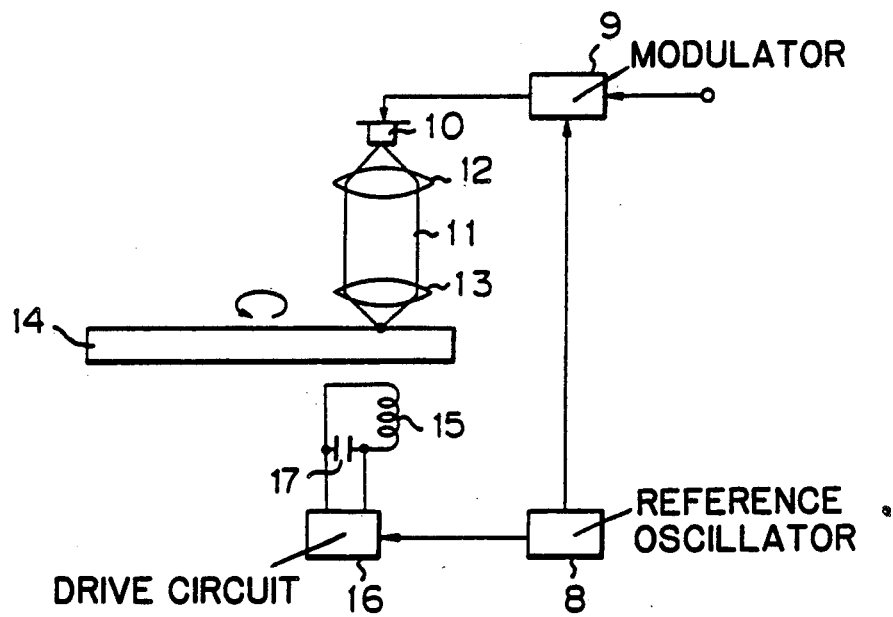
FIG. 3 shows one embodiment of the information recording apparatus of the present invention.

FIG. 3 shows an embodiment of apparatus according to the present invention for recording information on the opto-magnetic recording medium.

In the present apparatus, a laser beam 11 emitted from a laser light source 10 is modulated with a recording signal generated by a recording signal modulator 9 in synchronism with a reference signal of a constant frequency generated by a reference oscillator 8. The laser beam 11 emanating from the laser light source 10 passes through a collimater lens 12 and an objective lens 13 and irradiates to an opto-magnetic recording medium 14. A magnetic head 15 arranged to face the optical system on the opposite side of the recording medium is driven by a drive circuit 16 at the constant frequency generated by the reference oscillator 8 so that an A.C. magnetic field synchronized with the modulation signal for the laser beam 11 is applied to the opto-magnetic recording medium 14 to record the information. Numeral 17 denotes a capacitor which matches a resonance frequency of the recording magnetic head 15 to the reference frequency. The medium 14 is driven relative to the laser beam by drive means (not shown) such as a spindle motor.

The opto-magnetic recording medium was constructed by sequentially laminating a SiO film (1000 Å thick), a GdTbFe film (300 Å thick), a SiO film (500 Å thick), an Al film (500 Å thick) and a SiO film (4000 Å thick) on a pregrooved substrate made of polymethyl methacrylate (PMMA), and information was recorded in accordance with the present system by using the opto-magnetic information recording apparatus shown in FIG. 3. The recording conditions were: recording laser power 5 mW, beam diameter 1.46 μm, recording magnetic field variation frequency 4 MHz, recording signal frequency 1 MHz, and opto-magnetic recording medium rotating speed 600 rpm (relative velocity 5 m/sec).

The quality of information recorded was excellent and comparable with that of information recorded by the prior art system. Then, information was rewritten on the recorded area of the recording medium. The quality was as good as that of the initially recorded information.

In the present recording system, the recording bias magnetic field is not modulated, unlike the prior art magnetic field modulation recording system, and it may be an A.C. magnetic field of constant frequency. Accordingly, the magnetic field may be applied by a small scale resonance system so that the construction of the recording apparatus is easy.

The present invention is not limited to the illustrated embodiments but various modifications may be made without departing from the scope of the appended claims. The present invention includes all such modifications.

We claim:

1. A method for recording information on an opto-magnetic recording medium comprising the steps of:
    applying an alternating recording bias magnetic field having constant periods to the opto-magnetic recording medium, the direction of the magnetic field being inverted at each of the constant periods between a first predetermined direction and a second predetermined direction opposite to the first direction; and
    selectively performing scanning of the medium to which the bias magnetic field is applied, by irradiating the medium with a light beam applied to the medium selectively in accordance with a recording signal, to record information on the medium, the recording signal having periods varying in time interval, the selectively irradiated light beam irradiating the medium when the magnetic field is oriented in the first or second direction, respectively, in said applying step, wherein each of the varying periods of the recording signal is longer than each of the constant periods of the recording bias magnetic field.

2. A method for recording information on an opto-magnetic recording medium according to claim 1, wherein the following relation is met:

$$H > V/D$$

where H is the frequency of the magnetic field, $\overline{V}$ is a relative velocity between the medium and the light beam, and D is a diameter of the light beam on the medium.

3. An apparatus for recording information on an opto-magnetic recording medium, said apparatus comprising:
    applying means for applying an alternating recording bias magnetic field having constant periods to the medium, the direction of the magnetic field being inverted at each of the constant periods between a first predetermined direction and a second predetermined direction opposite to the first direction;
    irradiating means for irradiating the medium with a light beam selectively in accordance with a recording signal to record information on the medium, the recording signal having periods varying in time interval, said irradiating means irradiating the medium with the light beam when said applying means orients the magnetic field in the first magnetic field direction or in the second magnetic field direction, respectively, wherein each of the varying periods of the recording signal is longer than each of the constant periods of the recording bias magnetic field; and
    means for providing relative motion between the medium and the light beam.

4. An apparatus for recording information on an opto-magnetic recording medium according to claim 3, further comprising a reference oscillator, and wherein said applying means and said irradiating means are driven in synchronism with a reference frequency generated by said reference oscillator.

5. An apparatus for recording information on an opto-magnetic recording medium according to claim 3, wherein said irradiating means includes a laser light source and a lens system for focusing a laser beam emanating from said light source onto the medium.

6. An apparatus for recording information on an opto-magnetic recording medium according to claim 3, wherein said applying means includes a magnetic head arranged to face said irradiating means on the opposite side of the medium.

7. A method for recording information on an opto-magnetic recording medium having a recording layer including a magnetic thin film magnetized in a predetermined direction, said method comprising the steps of:
    applying an alternating recording bias magnetic field having constant periods to the opto-magnetic recording medium, the direction of the magnetic field being inverted at each of the constant periods between an upward direction and a downward direction; and
    selectively rendering the direction of magnetization of the recording layer in one of a first direction and a second direction in accordance with a recording signal having a period longer than that of the recording bias magnetic field, by scanning the medium to which the bias magnetic field is applied by a modulated light beam,
    wherein the first direction is the upward direction, rendered by applying the modulated light beam to the medium during a period of applying the magnetic field in the upward direction, and the second direction is the downward direction, rendered by applying the modulated light beam to the medium during a period of applying the magnetic field in the downward direction.

8. A method according to claim 7, further comprising satisfying the following condition:

$$H < V/D,$$

wherein H is the frequency of the bias magnetic field, V is a relative velocity between the recording medium and the light beam, and D is a diameter of the light beam on the recording medium.

9. An apparatus for recording information on an opto-magnetic recording medium having a recording layer including a magnetic thin film magnetized in a predetermined direction, said apparatus comprising:

applying means for applying an alternating recording bias magnetic field having constant periods to the opto-magnetic recording medium, the direction of the magnetic field being inverted at each of the constant periods between an upward direction and a downward direction;

irradiating means for selectively irradiating the recording medium with a light beam in accordance with a recording signal having a period longer than that of the recording bias magnetic field, at a time of applying the bias magnetic field in the upward or downward direction; and means for providing relative movement between the recording medium and the light beam.

10. An apparatus for recording information on an opto-magnetic recording medium according to claim 9, further comprising a reference oscillator, and wherein said applying means and said irradiating means are driven in synchronism with a reference frequency generated by said reference oscillator.

11. An apparatus for recording information in an opto-magnetic recording medium according to claim 9, wherein said irradiating means includes a laser light source and a lens system for focusing a laser beam emanating from said light source onto the medium.

12. An apparatus for recording information on an opto-magnetic recording medium according to claim 9, wherein said applying means includes a magnetic head arranged to face said irradiating means on the opposite side of the medium.

* * * * *

UNITED STATES PATENT AND TRADEMARK OFFICE
CERTIFICATE OF CORRECTION

PATENT NO. : 5,093,817
DATED : March 3, 1992
INVENTOR(S) : Eiichi Fujii, et al.

It is certified that error appears in the above-identified patent and that said Letters Patent is hereby corrected as shown below:

COLUMN 1

Line 58, "means a" should read --means of a--; and
    Line 59, "vice and" should read --vice, and--.

COLUMN 3

Line 22, "indicated" should read --irradiated--.

COLUMN 4

Line 38, "attained as" should read --attained, as--; and
    Line 50, "to" should be deleted.

COLUMN 5

Line 56, "$\overline{V}$" should read --V--.

Signed and Sealed this

Sixth Day of July, 1993

Attest:

MICHAEL K. KIRK

Attesting Officer     Acting Commissioner of Patents and Trademarks